(12) United States Patent
Zhang et al.

(10) Patent No.: US 12,114,611 B1
(45) Date of Patent: Oct. 15, 2024

(54) **ENVIRONMENT-CONTROLLABLE CULTIVATION DEVICE FOR *MORCHELLA ESCULENTA* PLANTING**

(71) Applicant: JIANGXI ACADEMY OF AGRICULTURAL SCIENCES, Nanchang (CN)

(72) Inventors: Cheng Zhang, Nanchang (CN); Jiping Ma, Nanchang (CN); Yinrun Xiao, Nanchang (CN); Yunping Wang, Nanchang (CN); Suzhen Wang, Nanchang (CN); Guoxiang Zhong, Nanchang (CN); Xiaowen Xiong, Nanchang (CN)

(73) Assignee: Jiangxi Academy of Agricultural Sciences, Nanchang (CN)

( * ) Notice: Subject to any disclaimer, the term of this patent is extended or adjusted under 35 U.S.C. 154(b) by 0 days.

(21) Appl. No.: 18/673,191

(22) Filed: May 23, 2024

(30) Foreign Application Priority Data

Nov. 21, 2023 (CN) .......................... 202311551040.0

(51) Int. Cl.
  *A01G 18/64* (2018.01)
  *A01G 18/69* (2018.01)
(52) U.S. Cl.
  CPC ............. *A01G 18/64* (2018.02); *A01G 18/69* (2018.02)
(58) Field of Classification Search
  CPC ......... A01G 18/60; A01G 18/64; A01G 18/69
  See application file for complete search history.

(56) References Cited

U.S. PATENT DOCUMENTS

| 2011/0258837 A1* | 10/2011 | Scannon ................. E04B 1/343 29/33 R |
| 2022/0279743 A1* | 9/2022 | Cross ................... A01K 63/047 |

(Continued)

FOREIGN PATENT DOCUMENTS

| CN | 204350701 U | 5/2015 |
| CN | 204466325 U | 7/2015 |

(Continued)

OTHER PUBLICATIONS

First Office Action from SIPO dated Dec. 26, 2023 in application No. 202311551040.0.

(Continued)

*Primary Examiner* — Monica L Perry
*Assistant Examiner* — Aaron M Rodziwicz
(74) *Attorney, Agent, or Firm* — Piloff Passino & Cosenza LLP; Rachel K. Piloff; Sean A. Passino

(57) ABSTRACT

An environment-controllable cultivation device for *Morchella esculenta* planting is provided, relating to the technical field of *Morchella esculenta* planting. The device includes a fixing seat and a *Morchella esculenta* cultivation cover. The *Morchella esculenta* cultivation cover is fixedly connected with the fixing seat, and a supporting top plate is fixedly installed at a top of the *Morchella esculenta* cultivation cover, and a water tank is fixedly installed on the supporting top plate; a mounting plate, where the mounting plate is located in the *Morchella esculenta* cultivation cover and is fixedly connected with the supporting top plate; and a cultivating mechanism, where the cultivating mechanism is located in the *Morchella esculenta* cultivation cover and is connected with the mounting plate, and the cultivating mechanism is also connected with the water tank. The cultivating mechanism includes a variable detection assembly, a soil moisturizing assembly and a cultivation assembly.

1 Claim, 9 Drawing Sheets

(56) References Cited

U.S. PATENT DOCUMENTS

| | | | | |
|---|---|---|---|---|
| 2022/0354069 | A1* | 11/2022 | Cordero | ............... A01G 18/64 |
| 2022/0400628 | A1* | 12/2022 | Reimnitz | ............... G08C 17/02 |
| 2024/0155981 | A1* | 5/2024 | Labrie | ............... A01G 18/69 |

FOREIGN PATENT DOCUMENTS

| | | | |
|---|---|---|---|
| CN | 105613032 | A | 6/2016 |
| CN | 205830457 | U | 12/2016 |
| CN | 108617412 | A | 10/2018 |
| CN | 109601259 | A | 4/2019 |
| CN | 208754846 | U | 4/2019 |
| CN | 210470519 | U | 5/2020 |
| CN | 212589321 | U | 2/2021 |
| CN | 113273439 | A | 8/2021 |
| CN | 216492449 | U | 5/2022 |
| CN | 217850549 | U | 11/2022 |
| CN | 218634920 | U | 3/2023 |
| CN | 218789510 | U | 4/2023 |
| CN | 219322998 | U | 7/2023 |
| CN | 116746428 | A | 9/2023 |
| CN | 116998360 | A | 11/2023 |
| KR | 200195645 | A | 9/2000 |
| KR | 101392557 | A | 5/2014 |
| KR | 20220058989 | A | 5/2022 |
| WO | WO-2022221951 A1 * | | 10/2022 ............. A01G 18/69 |

OTHER PUBLICATIONS

Notification to Grant Patent Right for Invention from SIPO dated Jan. 19, 2024 in application No. 202311551040.0.
First search report from SIPO dated Dec. 25, 2023 in application No. 202311551040.0.
Supplementary search report from SIPO dated Jan. 12, 2024 in application No. 202311551040.0.

* cited by examiner

ENVIRONMENT-CONTROLLABLE CULTIVATION DEVICE FOR *MORCHELLA ESCULENTA* PLANTING

CROSS-REFERENCE TO RELATED APPLICATIONS

This application claims priority to Chinese Patent Application No. 202311551040.0, filed on Nov. 21, 2023, the contents of which are hereby incorporated by reference.

TECHNICAL FIELD

The disclosure relates to the technical field of *Morchella esculenta* planting, and in particular to an environment-controllable cultivation device for *Morchella esculenta* planting.

BACKGROUND

*Morchella esculenta*, also known as *Morchella*, belongs to Ascomycetes, Pezizales and Morchellaceae, and is a precious edible and medicinal fungus. *Morchella esculenta* has a unique flavor, delicious taste, tender and crisp taste, and rich nutrition, and is considered as a "very good source of protein" and has the reputation of "the vegetarian delicacy with meaty flavors". *Morchella esculenta* was originally wild, and artificial planting of *Morchella esculenta* has been realized in recent years. With the improvement of people's awareness of *Morchella esculenta*, the demand of consumers for *Morchella esculenta* in the market is increasing, so it is necessary to plant *Morchella esculenta* artificially in a large area. The artificially planted *Morchella esculenta* has a fast fruiting time and a short cycle, generally from sowing to fruiting for about 60 days, and 1-3 crops may be harvested once planting. Moreover, *Morchella esculenta* is a low-temperature fungus, which requires high environmental conditions such as temperature and soil humidity.

In the existing artificial cultivation process of *Morchella esculenta*, with the fruiting and growth of *Morchella esculenta*, the requirements for the environment are constantly changing. However, if the cultivation environment of *Morchella esculenta* may not be well adjusted in real time, it is easy to cause the death of young *Morchella esculenta* and the abortion of fruiting bodies, thereby failing to cultivate high-quality *Morchella esculenta*, and seriously affecting the yield and quality of *Morchella esculenta*. Therefore, in view of the above situation, it is urgent to develop an environment-controllable cultivation device for *Morchella esculenta* planting to overcome the shortcomings in the current actual cultivation.

SUMMARY

An objective of the disclosure is to provide an environment-controllable cultivation device for *Morchella esculenta* planting, so as to solve the problems raised in the above background technology.

In order to achieve the above objective, the disclosure provides a following technical scheme:

an environment-controllable cultivation device for *Morchella esculenta* planting, including a fixing seat, and further including:
a *Morchella esculenta* cultivation cover, where the *Morchella esculenta* cultivation cover is fixedly connected with the fixing seat, and a supporting top plate is fixedly installed at a top of the *Morchella esculenta* cultivation cover, and a water tank is fixedly installed on the supporting top plate;
a mounting plate, where the mounting plate is located in the *Morchella esculenta* cultivation cover and is fixedly connected with the supporting top plate; and
a cultivating mechanism, where the cultivating mechanism is located in the *Morchella esculenta* cultivation cover and is connected with the mounting plate, and the cultivating mechanism is also connected with the water tank, where the cultivating mechanism includes a variable detection assembly, a soil moisturizing assembly and a cultivation assembly.

The variable detection assembly is connected with the mounting plate, the soil moisturizing assembly is connected with the *Morchella esculenta* cultivation cover and the variable detection assembly respectively, and the soil moisturizing assembly is also connected with the water tank, and the cultivation assembly is connected with the soil moisturizing assembly;
where, the cultivation assembly includes suspension frames, cultivation boxes and water inlets, and the suspension frames are connected with the soil moisturizing assembly, the cultivation boxes are fixedly connected with the suspension frames, the water inlets are opened on the suspension frames and in communication with the cultivation boxes, and the water inlets are also fitted with the soil moisturizing assembly.

As a scheme of the disclosure, the variable detection assembly includes:
a detection cylinder, where the detection cylinder is fixedly connected with the mounting plate, and the detection cylinder is internally provided with a displacement change detector;
a suspension moving piece, where the suspension moving piece is located in the detection cylinder and is slidably connected with the detection cylinder and the displacement change detector respectively; and
a first annular bracket, where the first annular bracket penetrates through the detection cylinder and is slidably connected with the detection cylinder, and the first annular bracket is also fixedly connected with the suspension moving piece.

As a further scheme of the disclosure, the soil moisturizing assembly includes:
detection control cylinders, where a number of the detection control cylinders is multiple, and the multiple detection control cylinders are uniformly distributed on the first annular bracket, and a second annular bracket is fixedly installed at other ends of the detection control cylinders;
sliding detection columns, where the sliding detection columns are slidably installed in the detection control cylinders and are fixedly connected with inner walls of the detection control cylinders through the displacement change detector, and the sliding detection columns are also fixedly connected with the suspension frames;
conduction controllers, where a number of the conduction controllers is multiple, the multiple conduction controllers are distributed in each of the detection control cylinders and are detachably connected with the sliding detection columns, and a distance between adjacent conduction controllers is greater than a height of each of the sliding detection columns; and
a moisturizing control unit, where the moisturizing control unit is fixedly connected with the first annular bracket and the second annular bracket respectively and is in communication with the water tank.

As a further scheme of the disclosure, the moisturizing control unit includes:
water supply pipes, where the water supply pipes are fixedly installed on the first annular bracket, and ends of the water supply pipes are in communication with the water tank, and other ends of the water supply pipes are provided with drip ports;
support seats, a number of the support seats is equal to a number of the cultivation boxes, and the multiple support seats are all fixedly installed on the second annular bracket, and rotating sleeves are rotatably installed on the support seats, and multiple inclined slots are formed in each of the rotating sleeves;
arc-shaped adjusting blocking plates, where the arc-shaped adjusting blocking plates are sleeved on middles of the rotating sleeves and are located directly above the water inlets, and the arc-shaped adjusting blocking plates are also located directly below the drip ports, where a thickness of each of the arc-shaped adjusting blocking plates gradually decreases along a reverse direction of a rotation of each of the rotating sleeves; and
an automatic driving module, where the automatic driving module is connected with the second annular bracket and the rotating sleeves respectively, and are connected with the Morchella esculenta cultivation cover.

As a further scheme of the disclosure, the automatic driving module includes:
supporting slide bars, where the supporting slide bars are fixedly installed on the second annular bracket;
an annular driving plate, where the annular driving plate is sleeved in the multiple rotating sleeves and is slidably connected with the supporting slide bars;
driving columns, where a number of the driving columns is multiple, the multiple driving columns are uniformly distributed on the annular driving plate, and the driving columns are also slidably connected with the inclined slots in each of the rotating sleeves;
a sliding column, where the sliding column is fixedly installed on the annular driving plate; and
an inclined guide frame, where the inclined guide frame is fixedly connected with an inner wall of the Morchella esculenta cultivation cover, and the inclined guide frame is also slidably connected with the sliding column.

As a further scheme of the disclosure, the device also includes a temperature control base, where the temperature control base is located between the fixing seat and the Morchella esculenta cultivation cover; and
temperature control discharge holes, where a number of the temperature control discharge holes is multiple, the multiple temperature control discharge holes are uniformly opened on each of the rotating sleeves, and the multiple temperature control discharge holes are also connected with the temperature control base through pipelines.

As a further scheme of the disclosure, the device further includes a storage ring groove, where the storage ring groove is fixedly installed on the fixing seat, and multiple shading cloths are accommodated in the storage ring groove;
arc-shaped positioning plates, where the arc-shaped positioning plates are fixedly connected with ends of the shading cloths and are detachably connected with the storage ring groove, where a number of the arc-shaped positioning plates is equal to a number of the shading cloths, and an arc length of each of the arc-shaped positioning plates is smaller than a width of each of the shading cloths; and
a shielding pulling assembly, where the shielding pulling assembly is connected with the arc-shaped positioning plates and the supporting top plate respectively.

As a further scheme of the disclosure, the shielding pulling assembly includes:
a control box, where the control box is located between the supporting top plate and the water tank;
winding devices, where the winding devices are located on the control box, and a number of the winding devices is equal to the number of the arc-shaped positioning plates, and the multiple winding devices are paired with the multiple arc-shaped positioning plates;
crown blocks, where a number of the crown blocks is multiple, and the multiple crown blocks are uniformly distributed on the supporting top plate;
pull ropes, ends of the pull ropes are fixedly connected with the arc-shaped positioning plates, and other ends of the pull ropes bypass the crown blocks and are connected with the winding devices; and
adsorption slots, where the adsorption slots are formed on the supporting top plate and the adsorption slots are also detachably connected with the arc-shaped positioning plates.

As a further scheme of the disclosure, the device further includes illumination detection plates, where a number of the illumination detection plates is equal to a number of the adsorption slots, and the multiple illumination detection plates are uniformly distributed on the water tank and are arranged opposite to the multiple adsorption slots.

Compared with the prior art, the disclosure has beneficial effects as follows.

When cultivating Morchella esculenta, firstly, the entire cultivation device may be moved to a designated area and fixed and installed through the fixing seat, where the fixing seat is provided with hooks and installation holes. In addition, multiple cultivation devices of the present disclosure may be distributed in a cultivation greenhouse, and the multiple cultivation devices are communicated through communication water pipes arranged on water tanks, so that the water tank on the cultivation device may be replenished in time. Then, multiple Morchella esculenta may be respectively planted in multiple cultivation boxes through the arranged Morchella esculenta cultivation cover, where the Morchella esculenta cultivation cover is provided with a single door, and the multiple cultivation boxes are respectively suspended in the Morchella esculenta cultivation cover through multiple suspension frames. Under the protection of the Morchella esculenta cultivation cover, Morchella esculenta may be prevented from being damaged by external unfavorable factors. During the cultivation of Morchella esculenta, through the variable detection assembly, changes of a total weight of the multiple cultivation boxes and soil and Morchella esculenta in the multiple cultivation boxes may be detected. As time goes by, the moisture in the soil will be absorbed and volatilized, so the humidity of the soil will decrease. When the variable detection assembly detects the weight change, the soil moisturizing assembly may be put into operation, so that clear water in the water tank may be dripped into the water inlets respectively, and then flow into the cultivation boxes through the water inlets, and then contact with the soil and Morchella esculenta respectively. When the variable detection assembly detects a change in the overall weight of the cultivation device again and the change reaches a set change value, the soil moisturizing assembly stop working, where the variable detection assembly only detects the change of the total weight. As the growth of *Morchella esculenta*, a set value of the total weight change detected by the variable detection assembly also increases accordingly. Therefore, with the growth of *Morchella esculenta*, sufficient water may be added to the cultivation boxes with a large number of *Morchella esculenta* and large mushroom bodies to ensure sufficient water supply. When the total weight changes, the variable detection assembly may send a signal to the soil moisturizing assembly to drip water. However, with the growth of *Morchella esculenta*, the weight of each of the cultivation boxes will also change. With the difference of the weight changes of the multiple cultivation boxes, a speed of adding water each time may be increased. When there is a significant difference in the weight changes among the multiple cultivation boxes, the soil moisturizing assembly feedback the difference to the variable detection assembly, causing the variable detection assembly to stop starting a water supply signal and give an alarm, allowing workers to check and correct *Morchella esculenta* in a corresponding device, and find out the reason for the significant weight difference. It is simple in operation, and the humidity of the soil where *Morchella esculenta* grows can be ensured. Moreover, the water supply can be adjusted automatically and in real time according to the growth status, which is conducive to cultivating high-quality *Morchella esculenta*, reducing the loss, improving yield, enhancing the intelligence of device, and providing convenience for the workers.

DETAILED DESCRIPTION OF THE EMBODIMENTS

Figure 1:
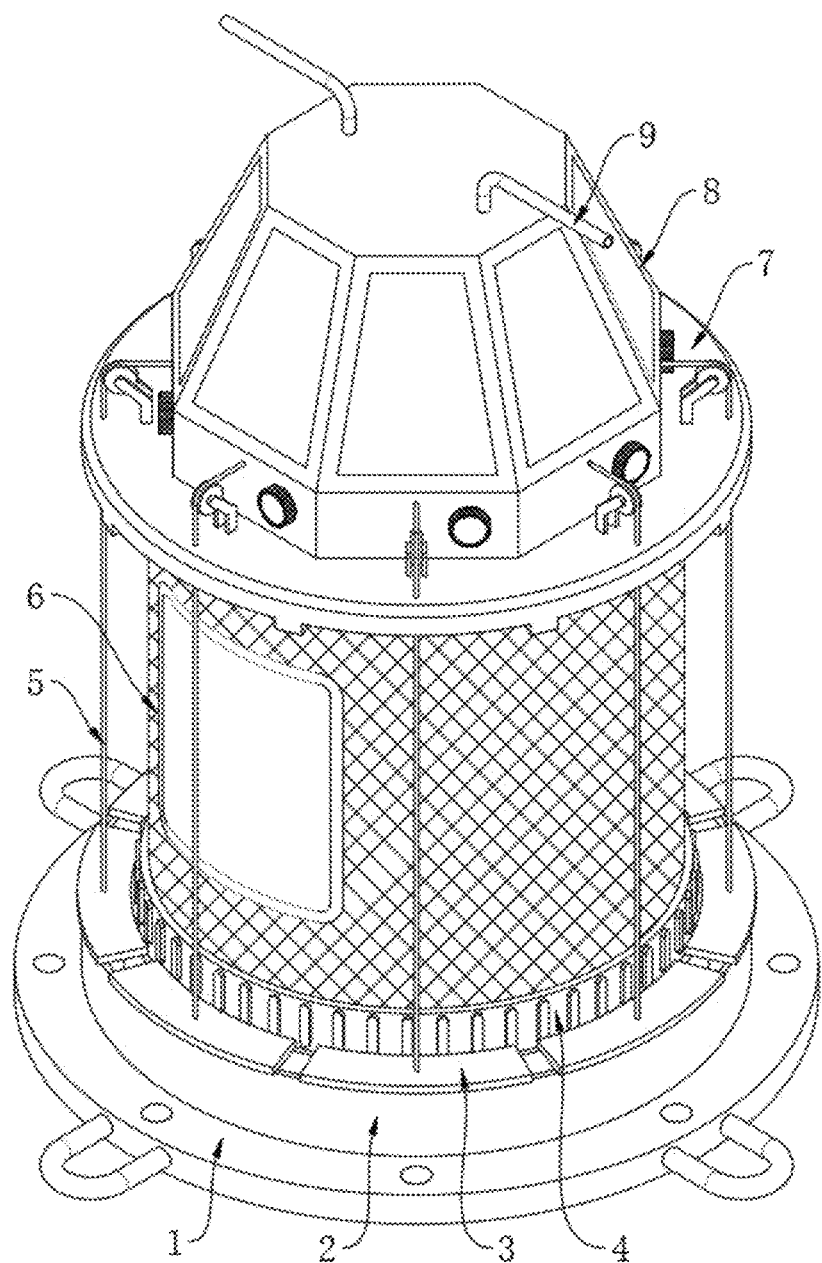
FIG. 1 is a schematic diagram of a three-dimensional structure of an environment-controllable cultivation device for *Morchella esculenta* planting in an embodiment of the disclosure.
Figure 2:
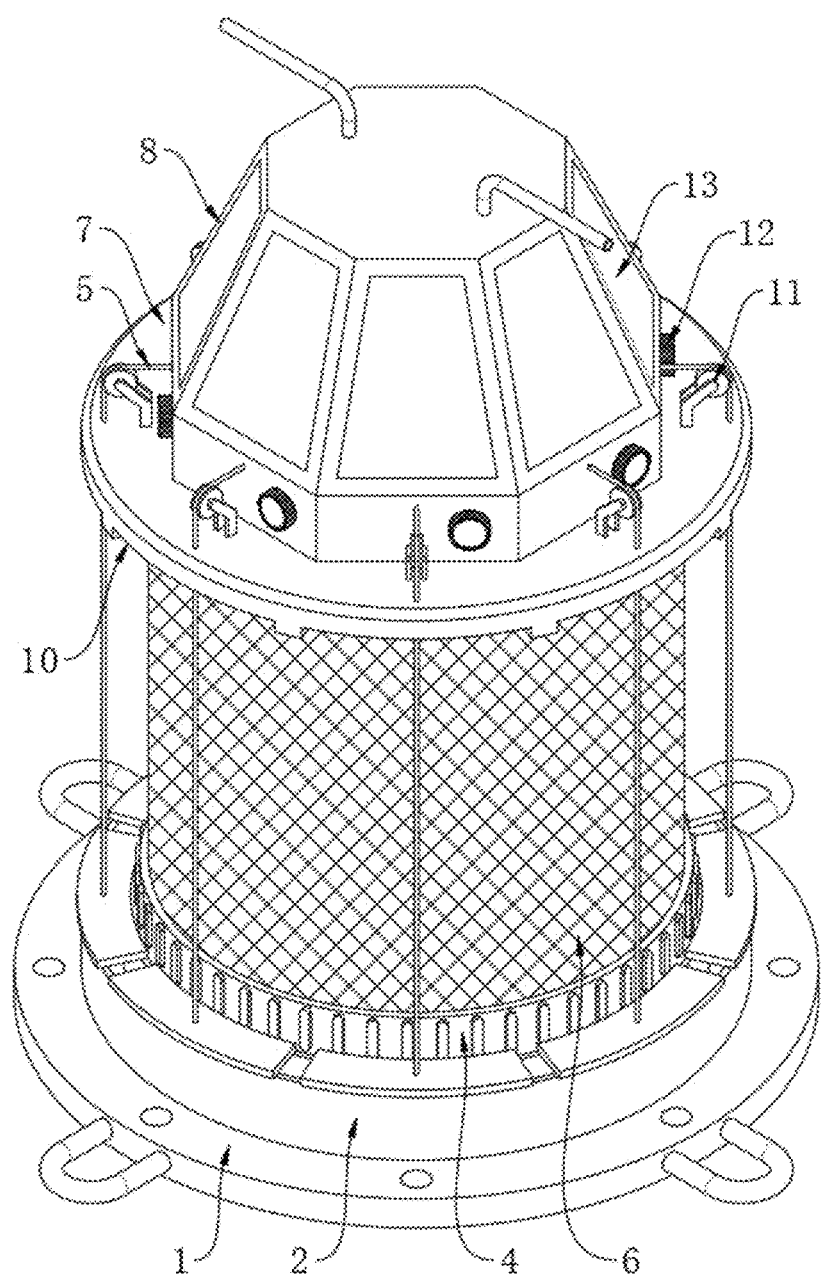
FIG. 2 is a schematic diagram of the three-dimensional structure of a *Morchella esculenta* cultivation cover in an embodiment of the disclosure.
Figure 3:
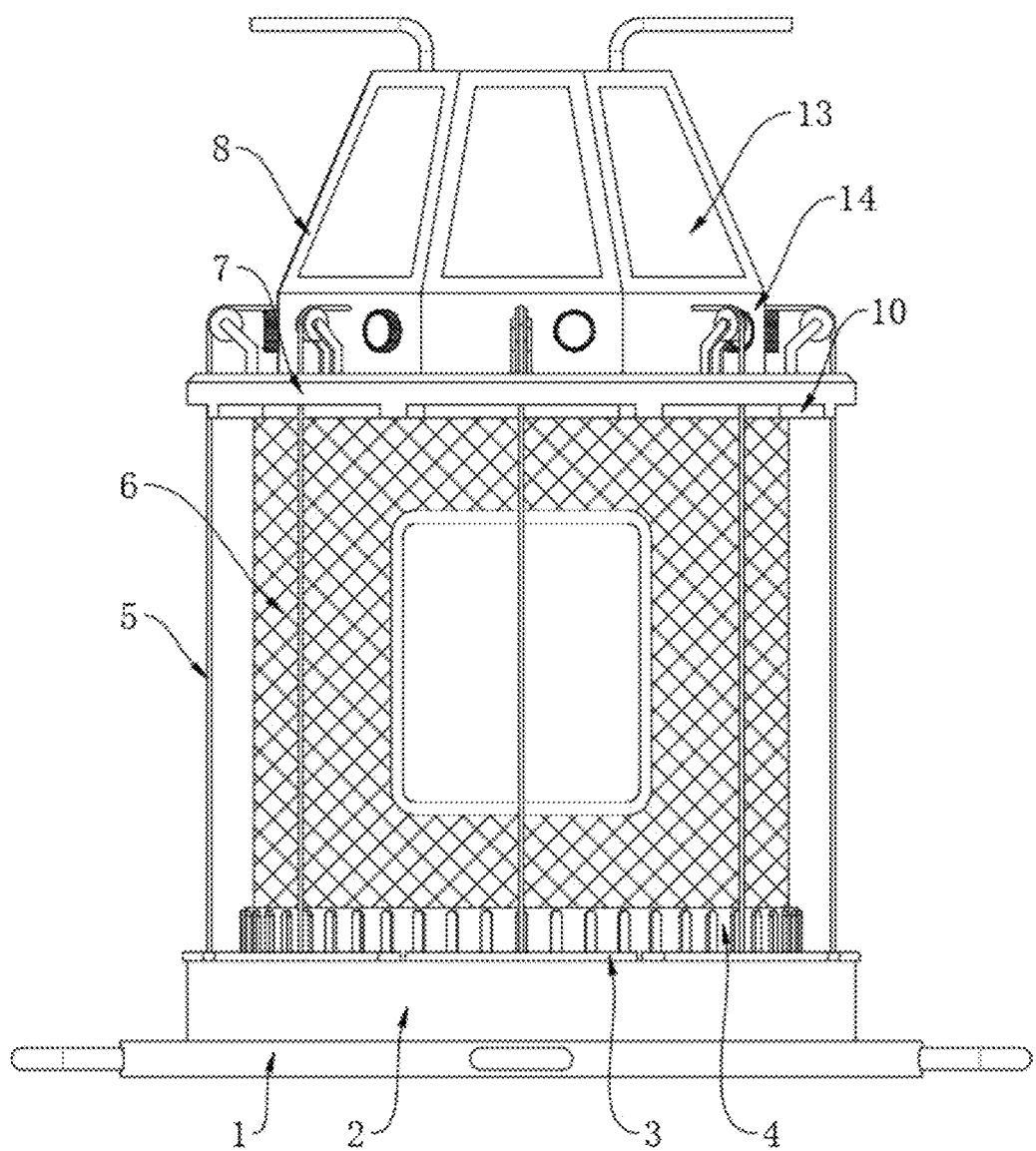
FIG. 3 is a structural schematic front view of a water tank in an embodiment of the disclosure.
Figure 4:
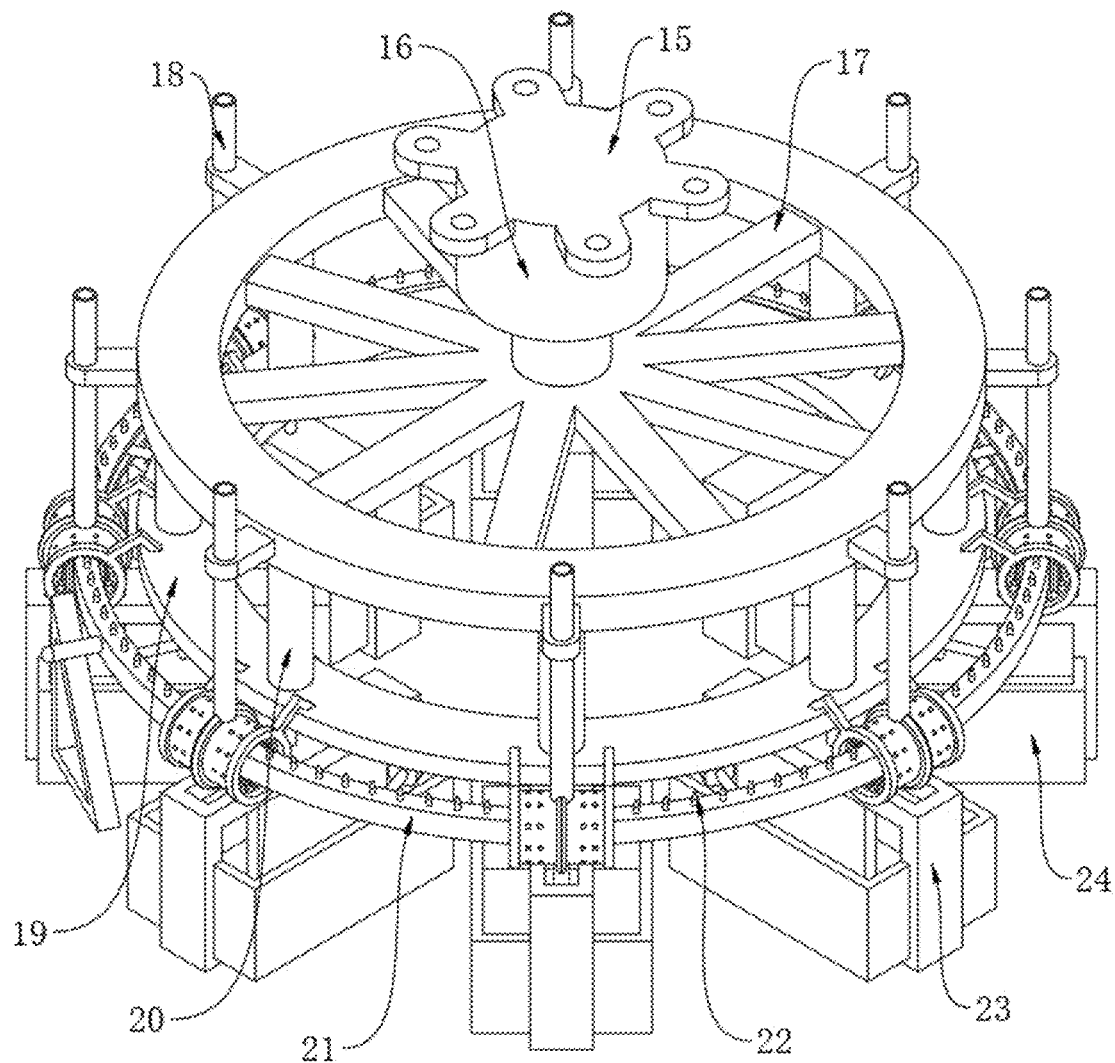
FIG. 4 is a schematic view of a three-dimensional structure of annular driving plates in an embodiment of the disclosure.

In the following, a technical scheme in embodiments of the disclosure will be clearly and completely described in combination with attached drawings in embodiments of the disclosure. Obviously, described embodiments are only a part of the embodiments of the disclosure, but not all the embodiments. Based on the embodiments in the disclosure, all other embodiments obtained by those skilled in the art without creative effort belong to a protection scope of the disclosure.

The specific implementation of the disclosure will be described in detail in combination with specific embodiments.

With reference to FIG. 1 to FIG. 9, an embodiment of the disclosure provides an environment-controllable cultivation device for *Morchella esculenta* planting, including a fixing seat 1, and further including:

a *Morchella esculenta* cultivation cover 6, where the *Morchella esculenta* cultivation cover 6 is fixedly connected with the fixing seat 1, and a supporting top plate 7 is fixedly installed at a top of the *Morchella esculenta* cultivation cover 6, and a water tank 8 is fixedly installed on the supporting top plate 7;

a mounting plate 15, where the mounting plate 15 is located in the *Morchella esculenta* cultivation cover 6 and is fixedly connected with the supporting top plate 7; and a cultivating mechanism, where the cultivating mechanism is located in the *Morchella esculenta* cultivation cover 6 and is connected with the mounting plate 15, and the cultivating mechanism is also connected with the water tank 8, where the cultivating mechanism includes a variable detection assembly, a soil moisturizing assembly and a cultivation assembly.

The variable detection assembly is connected with the mounting plate 15, the soil moisturizing assembly is connected with both the *Morchella esculenta* cultivation cover 6 and the variable detection assembly, and the soil moisturizing assembly is also connected with the water tank 8, and the cultivation assembly is connected with the soil moisturizing assembly.

The cultivation assembly includes suspension frames 23, cultivation boxes 24 and water inlets 27, where the suspension frames 23 are connected with the soil moisturizing assembly, the cultivation boxes 24 are fixedly connected with the suspension frames 23 respectively, the water inlets 27 are opened on the suspension frames 23 respectively and in communication with the cultivation boxes 24 respectively, and the water inlets 27 are also fitted with the soil moisturizing assembly.

When cultivating *Morchella esculenta*, firstly, the entire cultivation device may be moved to a designated area and fixed and installed through the fixing seat 1, where the fixing seat 1 is provided with hooks and installation holes. In addition, multiple cultivation devices of the disclosure may be distributed in a cultivation greenhouse, and the multiple cultivation devices are in fluid communication with each other through communication water pipes 9 arranged on water tanks 8, so that each of the water tanks 8 on a corresponding one of the cultivation devices may be replenished in time. Then, multiple *Morchella esculenta* may be respectively planted in multiple cultivation boxes 24 through the arranged *Morchella esculenta* cultivation cover 6, where the *Morchella esculenta* cultivation cover 6 is provided with a single door. And the multiple cultivation boxes 24 are respectively suspended in the *Morchella esculenta* cultivation cover 6 through multiple suspension frames 23, and under the protection of the *Morchella esculenta* cultivation cover 6, *Morchella esculenta* may be prevented from being damaged by external unfavorable factors. During the cultivation of *Morchella esculenta*, through the variable detection assembly, changes of a total weight of the multiple cultivation boxes 24 and soil and *Morchella esculenta* in the multiple cultivation boxes 24 may be detected. As time goes by, the moisture in the soil will be absorbed and volatilized, so the humidity of the soil will decrease. When the variable detection assembly detects the weight change, the soil moisturizing assembly may be put into operation, so that clear water in the water tank 8 may be dripped into the water inlets 27 respectively, and then flow into the cultivation boxes 24 through the water inlets 27, and then contact with the soil and *Morchella esculenta* respectively. When the variable detection assembly detects a change in the overall weight of the cultivation device again and the change reaches a set change value, the soil moisturizing assembly stop working. The variable detection assembly only detects the change of the total weight. As the growth of *Morchella esculenta*, a set value of the total weight change detected by the variable detection assembly also increases accordingly. Therefore, with the growth of *Morchella esculenta*, sufficient water may be added to the cultivation boxes 24 with a large number of *Morchella esculenta* and large mushroom bodies to ensure sufficient water supply. When the total weight changes, the variable detection assembly may send a signal to the soil moisturizing assembly to drip water. However, with the growth of *Morchella esculenta*, the weight of each of the cultivation boxes 24 will also change. With the difference of the weight changes of the multiple cultivation boxes 24, a speed of adding water each time may be increased. When there is a significant difference in the weight changes among the multiple cultivation boxes 24, the soil moisturizing assembly feedback the difference to the variable detection assembly, causing the variable detection assembly to stop starting a water supply signal and give an alarm, allowing workers to check and correct *Morchella esculenta* in a corresponding device, and find out the reason for the significant weight difference. It is simple in operation, and the humidity of the soil where *Morchella esculenta* grows can be ensured. Moreover, the water supply can be adjusted automatically and in real time according to the growth status, which is conducive to cultivating high-quality *Morchella esculenta*, reducing the loss, improving yield, enhancing the intelligence of device, and providing convenience for the workers.

In one embodiment of the disclosure, with reference to FIG. 1 to FIG. 9, the variable detection assembly includes:
 a detection cylinder 16, where the detection cylinder 16 is fixedly connected with the mounting plate 15, and the detection cylinder 16 is internally provided with a displacement change detector 34;
 a suspension moving piece 33, where the suspension moving piece 33 is located in the detection cylinder 16 and is slidably connected with the detection cylinder 16 and the displacement change detector 34 respectively; and
 a first annular bracket 17, where the first annular bracket 17 penetrates through the detection cylinder 16 and is slidably connected with the detection cylinder 16, and the first annular bracket 17 is also fixedly connected with the suspension moving piece 33.

With reference to FIG. 1 to FIG. 9, the soil moisturizing assembly includes:
 detection control cylinders 20, where a number of the detection control cylinders 20 is multiple, and the multiple detection control cylinders 20 are uniformly distributed on the first annular bracket 17, and a second annular bracket 19 is fixedly installed at other ends of the detection control cylinders 20;
 sliding detection columns 35, where the sliding detection columns 35 are respectively slidably installed in the detection control cylinders 20 and fixedly connected with inner walls of the detection control cylinders 20 through the displacement change detector 34, and the sliding detection columns 35 are also fixedly connected with the suspension frames 23 respectively;
 conduction controllers 36, where a number of the conduction controllers 36 is multiple, the multiple conduction controllers 36 are distributed in each of the detection control cylinders 20 and are detachably connected with the sliding detection columns 35, and a distance between the adjacent conduction controllers 36 is greater than a height of the sliding detection column 35; and
 a moisturizing control unit, where the moisturizing control unit is fixedly connected with the first annular bracket 17 and the second annular bracket 19 respectively and is in communication with the water tank 8.

With reference to FIG. 1 to FIG. 9, the moisturizing control unit includes:
 water supply pipes 18, where the water supply pipes 18 are fixedly installed on the first annular bracket 17, and ends of the water supply pipes 18 are in communication with the water tank 8, and other ends of the water supply pipes 18 are respectively provided with drip ports 29;
 support seats 32, a number of the support seats 32 is equal to a number of the cultivation boxes 24, and the multiple support seats 32 are all fixedly installed on the second annular bracket 19, and rotating sleeves 30 are rotatably installed on the support seats 32 respectively, and multiple inclined slots are formed in each of the rotating sleeves 30;
 arc-shaped adjusting blocking plates 28, where the arc-shaped adjusting blocking plates 28 are respectively sleeved onto middles of the rotating sleeves 30 and located directly above the water inlets 27, and the arc-shaped adjusting blocking plates 28 are also located directly below the drip ports 29 respectively, a thickness of the arc-shaped adjusting blocking plate 28 gradually decreases along a reverse direction of a rotation of the rotating sleeve 30; and
 an automatic driving module, where the automatic driving module is connected with the second annular bracket 19 and the rotating sleeves 30 respectively, and is connected with the *Morchella esculenta* cultivation cover 6.

With reference to FIG. 1 to FIG. 9, the automatic driving module includes:
 supporting slide bars 37, where the supporting slide bars 37 are fixedly installed on the second annular bracket 19;
 an annular driving plate 21, where the annular driving plate 21 is sleeved in the multiple rotating sleeves 30 and is slidably connected with the supporting slide bars 37;
 driving columns 22, where a number of the driving columns 22 is multiple, the multiple driving columns 22 are uniformly distributed on the annular driving plate 21, and the driving columns 22 are also slidably connected with the inclined slots in the rotating sleeve 30;
 a sliding column 26, where the sliding column 26 is fixedly installed on the annular driving plate 21; and
 an inclined guide frame 25, where the inclined guide frame 25 is fixedly connected with an inner wall of the

*Morchella esculenta* cultivation cover 6, and the inclined guide frame 25 is also slidably connected with the sliding column 26.

With reference to FIG. 1 to FIG. 9, the device also includes a temperature control base 4, where the temperature control base 4 is located between the fixing seat 1 and the *Morchella esculenta* cultivation cover 6; and temperature control discharge holes 31, where a number of the temperature control discharge holes 31 is multiple, the multiple temperature control discharge holes 31 are uniformly arranged on each of the rotating sleeves 30, and the multiple temperature control discharge holes 31 are also connected with the temperature control base 4 through pipelines.

The displacement change detector 34 may detect the displacement change through the arranged suspension moving piece 33, where the suspension moving piece 33 may adopt a structure in which a slider and an elastic member are matched. As the soil moisture decreases, the total weight decreases, so the suspension moving piece 33 moves up. With the growth of *Morchella esculenta*, the total weight increases, so a position of the suspension moving piece 33 in the detection cylinder 16 will continuously descend. Therefore, the displacement change detector 34 may detect the change of the total weight, and then relevant valves are started, so that the clear water in the water tank 8 drops into the water inlets 27 through the water supply pipes 18 and the drip ports 29. In addition, in an early stage of planting, because the *Morchella esculenta* is small and absorbs less water by itself, at this time, the drip port 29 is blocked by a larger thickness part of the arc-shaped adjusting blocking plate 28, allowing the clear water to slowly drip into the water inlet 27 along the arc-shaped adjusting blocking plate 28, preventing the clear water from splashing the soil on the surface of small *Morchella esculenta* and affecting the quality of *Morchella esculenta*. Additionally, the amount of clear water dripping in the each of the cultivation boxes 24 is approximately the same.

Figure 5:
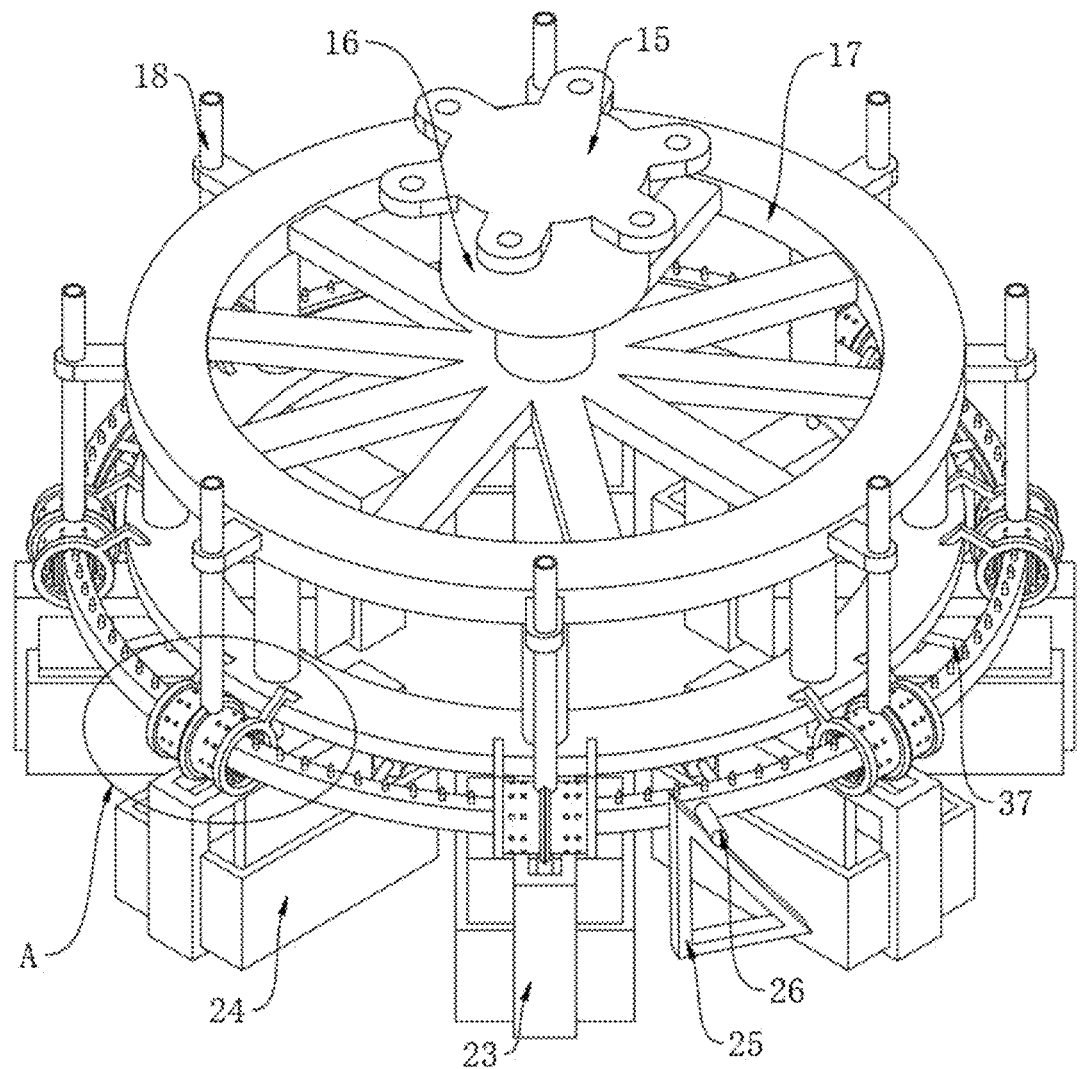
FIG. 5 is a schematic view of a three-dimensional structure of a first annular bracket in an embodiment of the disclosure.
Figure 6:
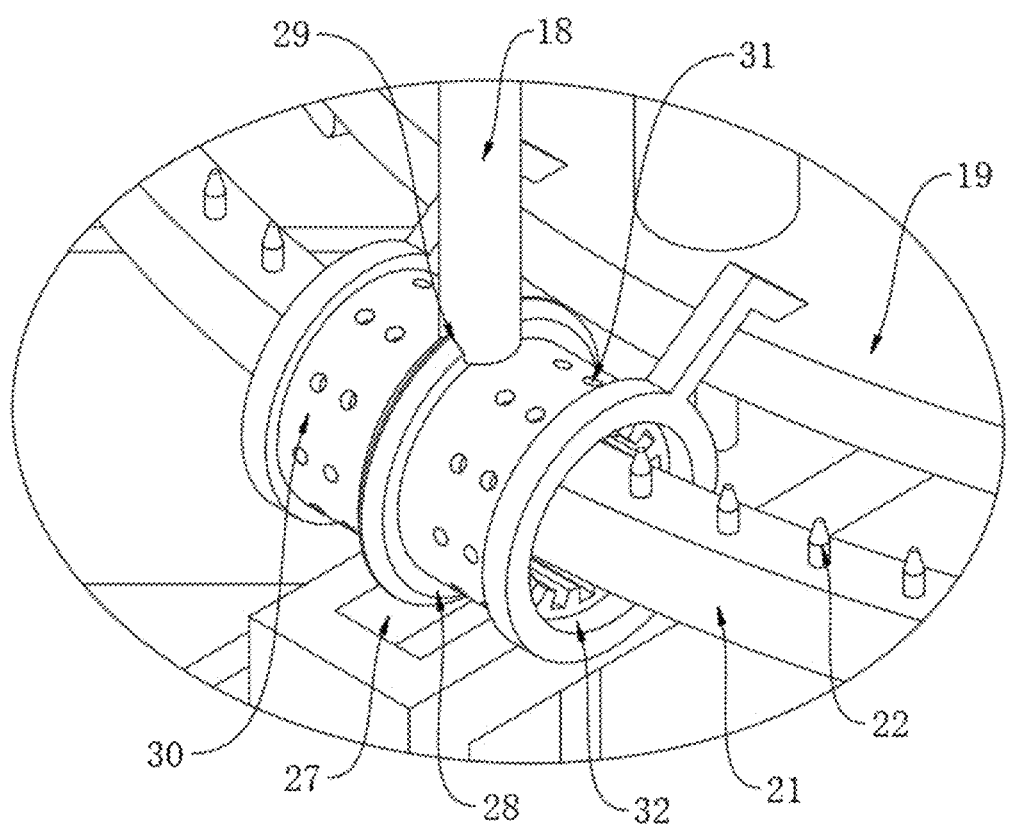
FIG. 6 is an enlarged structural diagram of part A in FIG. 5 according to an embodiment of the disclosure.
Figure 7:
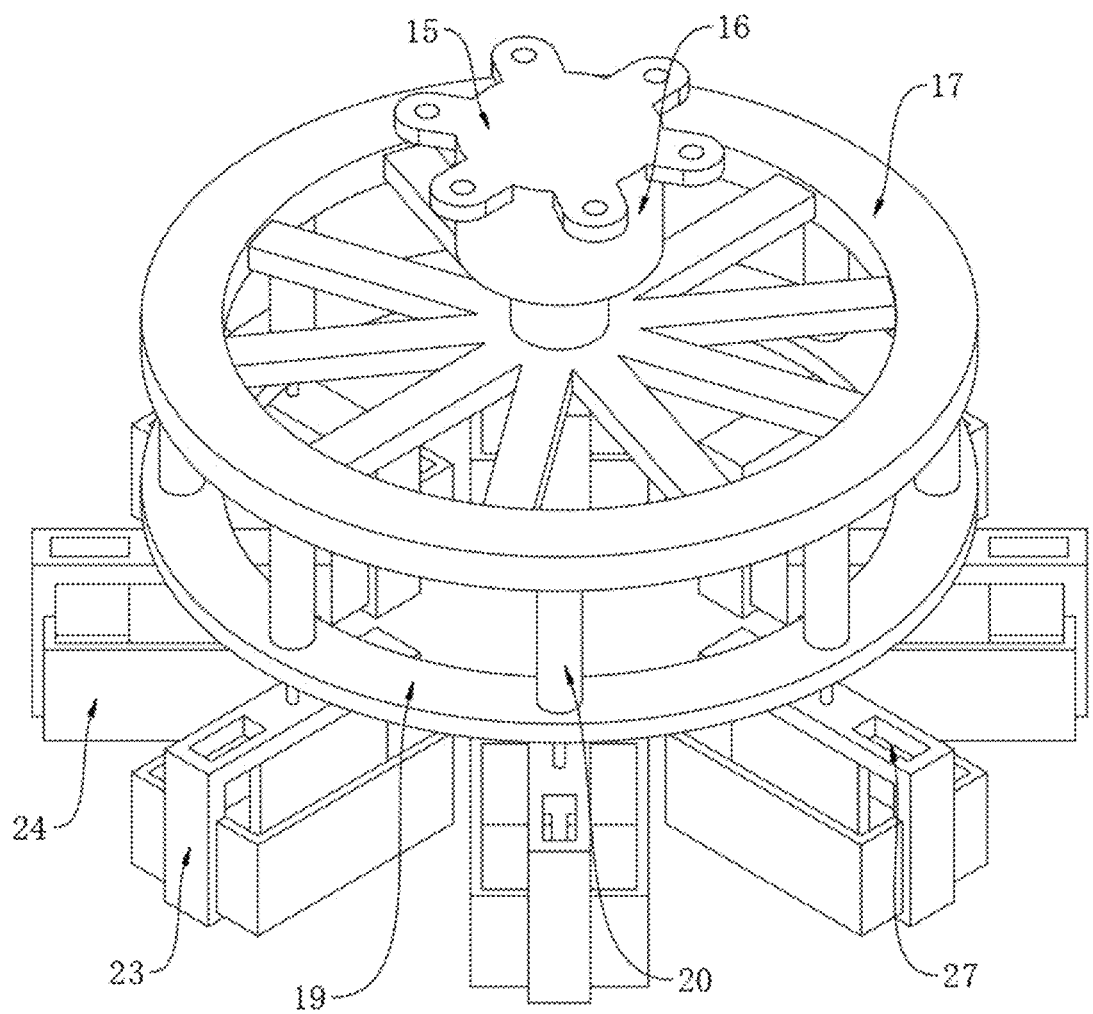
FIG. 7 is a schematic diagram of a three-dimensional structure of a second annular bracket in an embodiment of the disclosure.
Figure 8:
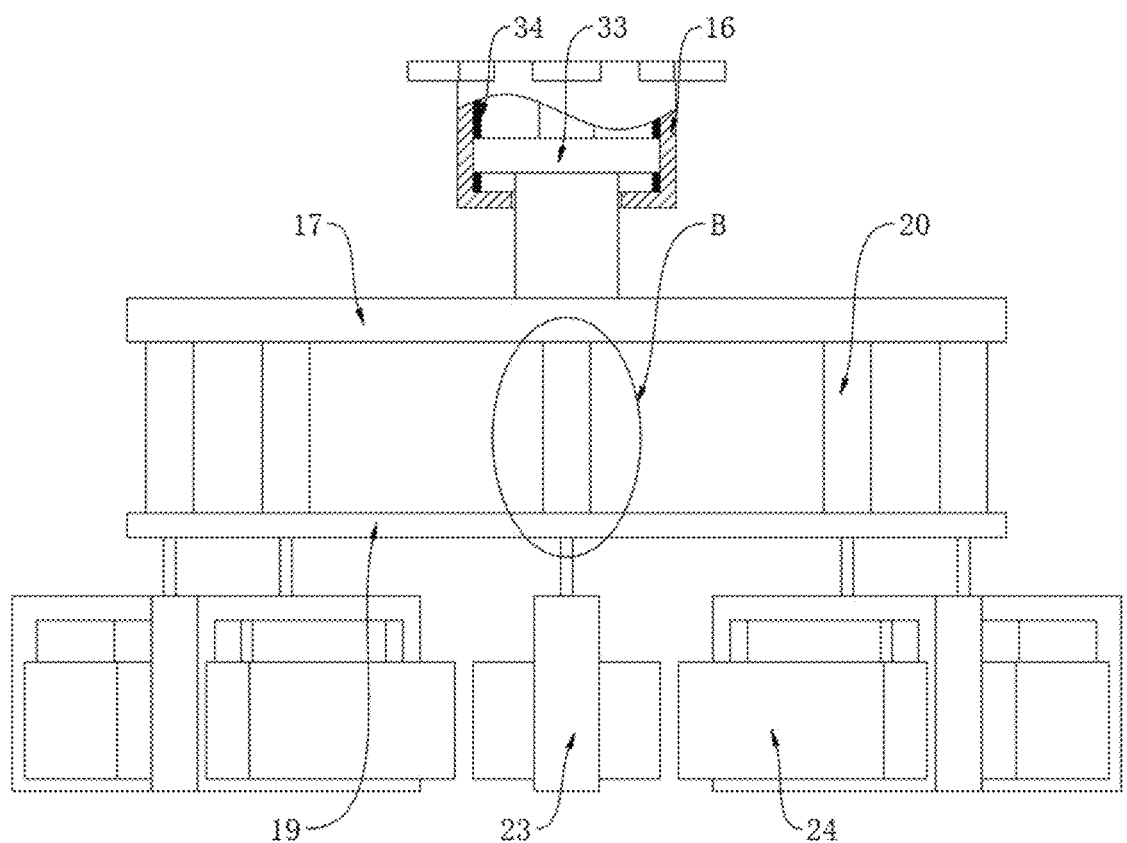
FIG. 8 is a partial cross-sectional structural schematic diagram of a detection cylinder in an embodiment of the disclosure.
Figure 9:
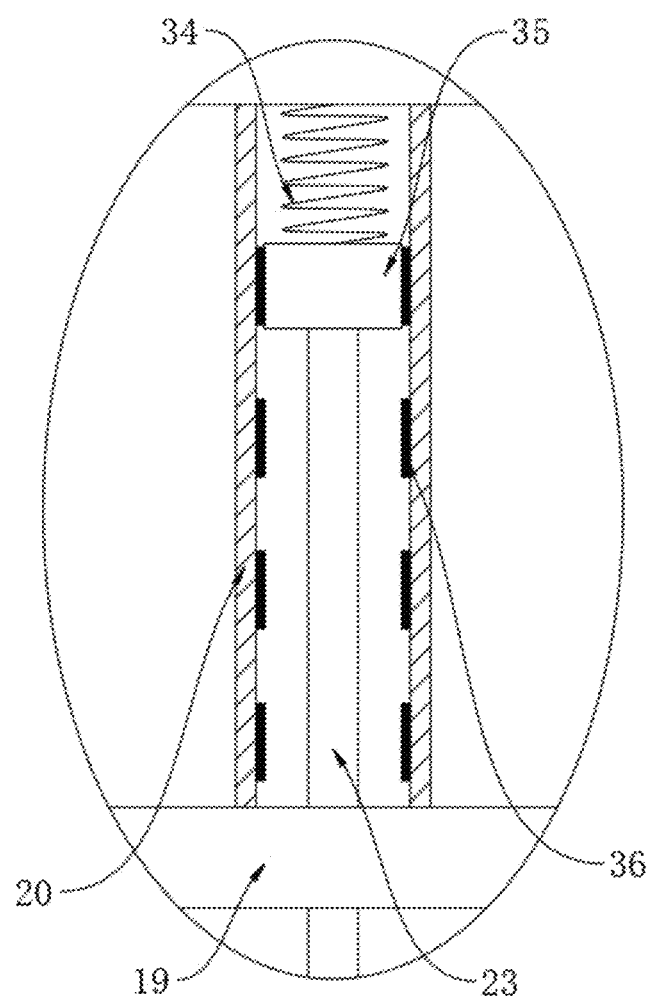
FIG. 9 is an enlarged cross-sectional structural schematic diagram of part B in FIG. 8 according to an embodiment of the disclosure.

With the growth of *Morchella esculenta*, while the total weight changes, the first annular bracket 17 and the second annular bracket 19 will move down, and the annular driving plate 21 will be driven to move down synchronously through the supporting slide bars 37. During the downward movement of the annular driving plate 21, the sliding column 26 may slide on the inclined guide frame 25, and under the guidance of the inclined guide frame 25, the sliding column 26 may push the annular driving plate 21 to rotate counter clockwise (as shown in FIG. 5). During the rotation of the annular driving plate 21, the multiple driving columns 22 may slide in the inclined slots of the rotating sleeves 30, thereby driving the rotating sleeves 30 to rotate. During the rotation of the rotating sleeve 30, the arc-shaped adjusting blocking plate 28 rotates synchronously, and a smaller thickness part of the arc-shaped adjusting blocking plate 28 rotates directly below the drip port 29, thereby increasing the gap between the drip port 29 and the arc-shaped adjusting blocking plate 28. When adding water, the set value of the total weight change is increased, so the amount of water added is also increased accordingly to ensure sufficient water supply. At this time, as the gap between the drip port 29 and the arc-shaped adjusting blocking plate 28 increases, the speed of adding water may be increased, enabling the soil to quickly restore to a required humidity state.

In addition, with the growth of *Morchella esculenta*, when the weight of the each of the cultivation boxes 24 changes, the sliding detection column 35 is pulled down in the detection control cylinder 20 through the suspension frame 23. In the process of pulling the sliding detection column 35 down by the each of the cultivation boxes 24, a downward displacement of each sliding detection column 35 is approximately the same, so that the sliding detection column 35 will always be in contact with the conduction controllers 36 in each detection control cylinder 20 at the same time. Therefore, a circuit of the entire device is in an on-line state, where a number of the conduction controllers 36 may be set according to a growth cycle of *Morchella esculenta*. For example, if the growth cycle of *Morchella esculenta* is about fifty days, and ten days is taken as a detection cycle, the number of the conduction controllers 36 in each detection control cylinder is set to five, so that five growth stages of *Morchella esculenta* may be detected. When there is a significant difference in weight changes among the multiple cultivation boxes 24 during one stage, the displacement of the multiple sliding detection columns 35 during descent is not synchronized. Because the distance between the adjacent conduction controllers 36 is slightly greater than the height of the sliding detection column 35 (the difference between the distance and the height is small, so that the weight changes among the multiple cultivation boxes 24 are within an error range). At a certain position, the multiple sliding detection columns 35 may not be able to contact the conduction controllers 36 simultaneously, causing the entire circuit to break and rendering the variable detection assembly inoperable, avoiding continuous water supply to the cultivation boxes 24 without the workers knowing the growth status of *Morchella esculenta*. At the same time, alerts are issued to the workers for timely checking and correction.

Meanwhile, by the arrangement of the temperature control base 4 and the temperature control discharge holes 31, hot air or cold air may be conveyed into the temperature control discharge holes 31 by the temperature control base, so that the vicinity of the multiple cultivation boxes 24 are in the same and constant temperature state, thereby avoiding the great difference in the growth of *Morchella esculenta* in the multiple cultivation boxes 24.

In one embodiment of the disclosure, with reference to FIG. 1 to FIG. 8, and the device further includes a storage ring groove 2, where the storage ring groove 2 is fixedly installed on the fixing seat 1, and multiple shading cloths are accommodated in the storage ring groove;

arc-shaped positioning plates 3, where each of the arc-shaped positioning plates 3 is fixedly connected with an end of a corresponding one of the shading cloths and is detachably connected with the storage ring groove 2, where a number of the arc-shaped positioning plates 3 is equal to a number of the shading cloths, and an arc length of the arc-shaped positioning plate 3 is smaller than a width of the shading cloth; and a shielding pulling assembly, where the shielding pulling assembly is connected with the arc-shaped positioning plates 3 and the supporting top plate 7 respectively.

With reference to FIG. 1 to FIG. 8, the shielding pulling assembly includes:

a control box 14, where the control box 14 is located between the supporting top plate 7 and the water tank 8;

winding devices 12, where the winding devices 12 are located on the control box 14, and a number of the winding devices 12 is equal to the number of the arc-shaped positioning plates 3, and the multiple winding devices 12 are paired with the multiple arc-shaped positioning plates 3 respectively;

crown blocks 11, where a number of the crown blocks 11 is multiple, and the multiple crown blocks 11 are uniformly distributed on the supporting top plate 7;

pull ropes 5, ends of the pull ropes 5 are fixedly connected with the arc-shaped positioning plates 3, and other ends of the pull ropes 5 respectively bypass the crown blocks 11 and are connected with the winding devices 12; and adsorption slots 10, where the adsorption slots 10 are formed on the supporting top plate 7 and the adsorption slots 10 are also detachably connected with the arc-shaped positioning plates 3 respectively.

With reference to FIG. 1 to FIG. 8, the device further includes illumination detection plates 13, where a number of the illumination detection plates 13 is equal to a number of the adsorption slots 10, and the multiple illumination detection plates 13 are uniformly distributed on the water tank 8 and are arranged opposite to the multiple adsorption slots 10.

During the cultivation of *Morchella esculenta*, if a dark environment is needed, the pull ropes 5 may be pulled and the arc-shaped positioning plates 3 may be driven to move up through the arranged winding devices 12, so that the shading cloths located in the storage ring groove 2 may be pulled out to shield the *Morchella esculenta* cultivation cover 6. Therefore, *Morchella esculenta* may grow in dark light under strong light. The winding devices 12 may be in a form of automatic mechanical winding or manual driving winding, and will not be described in detail here. Moreover, the light intensity may be detected through the arranged illumination detection plates 13, where the illumination detection plates 13 may be made of heat-absorbing materials. On one hand, the clear water in the water tank 8 may be heated, and on the other hand, the light intensity in all directions may be detected. Through the cooperation of the illumination detection plates 13, the multiple pull ropes 5 and the shading cloths, it is selectable to shade the entire *Morchella esculenta* cultivation cover 6 or shade a part of the *Morchella esculenta* cultivation cover 6 in a certain direction, which is beneficial to improving the practicability and flexibility of the device.

It should be noted that in the disclosure, unless otherwise specified and limited, terms such as "slide", "rotate", "fix" and "provide" should be broadly understood. For example, unless otherwise specified, these terms may refer to welded connection, may also refer to bolted connection, or integration, may refer to mechanical connection, and may also refer to electrical connection, may refer to direct connection, may also refer to indirect connection through an intermediary, and internal communication or interaction between two elements. For those skilled in the art, specific meanings of the above terms in the disclosure may be understood according to specific situations.

In addition, it should be understood that although this specification is described in terms of embodiments, not every embodiment only contains an independent technical scheme, and this description way of the specification is only for a sake of clarity. Those skilled in the art should take the specification as a whole, and the technical solutions in various embodiments may also be appropriately combined to form other embodiments that may be understood by those skilled in the art.

What is claimed is:

1. An environment-controllable cultivation device for *Morchella esculenta* planting, comprising a fixing seat, and further comprising:

a *Morchella esculenta* cultivation cover, wherein the *Morchella esculenta* cultivation cover is fixedly connected with the fixing seat, and a supporting top plate is fixedly installed at a top of the *Morchella esculenta* cultivation cover, and a water tank is fixedly installed on the supporting top plate;

a mounting plate, wherein the mounting plate is located in the *Morchella esculenta* cultivation cover and is fixedly connected with the supporting top plate; and a cultivating mechanism, wherein the cultivating mechanism is located in the *Morchella esculenta* cultivation cover and is connected with the mounting plate, and the cultivating mechanism is also connected with the water tank, wherein the cultivating mechanism comprises a variable detection assembly, a soil moisturizing assembly and a cultivation assembly;

wherein the variable detection assembly is connected with the mounting plate, the soil moisturizing assembly is connected with the *Morchella esculenta* cultivation cover and the variable detection assembly respectively, and the soil moisturizing assembly is also connected with the water tank, and the cultivation assembly is connected with the soil moisturizing assembly;

wherein the cultivation assembly comprises suspension frames, cultivation boxes and water inlets, and the suspension frames are connected with the soil moisturizing assembly, the cultivation boxes are fixedly connected with the suspension frames, the water inlets are opened on the suspension frames and in communication with the cultivation boxes, and the water inlets are also fitted with the soil moisturizing assembly;

wherein the variable detection assembly comprises: a detection cylinder, wherein the detection cylinder is fixedly connected with the mounting plate, and the detection cylinder is internally provided with a displacement change detector;

a suspension moving piece, wherein the suspension moving piece is located in the detection cylinder and is slidably connected with the detection cylinder and the displacement change detector respectively; and a first annular bracket, wherein the first annular bracket penetrates through the detection cylinder and is slidably connected with the detection cylinder, and the first annular bracket is also fixedly connected with the suspension moving piece;

wherein the soil moisturizing assembly comprises: detection control cylinders, a number of the detection control cylinders is plural, a plurality of the detection control cylinders are uniformly distributed on the first annular bracket, and a second annular bracket is fixedly installed at other ends of the detection control cylinders;

sliding detection columns, wherein the sliding detection columns are slidably installed in the detection control cylinders and are fixedly connected with inner walls of the detection control cylinders through the displacement change detector, and the sliding detection columns are also fixedly connected with the suspension frames;

conduction controllers, a number of the conduction controllers is plural, a plurality of the conduction controllers are distributed in the detection control cylinders and are detachably connected with the sliding detection columns, and a distance between adjacent conduction controllers is greater than a height of each of the sliding detection columns; and a moisturizing control unit, wherein the moisturizing control unit is fixedly connected with the first annular bracket and the second annular bracket respectively and is in communication with the water tank;

wherein the moisturizing control unit comprises: water supply pipes, wherein the water supply pipes are fixedly installed on the first annular bracket, and ends of the water supply pipes are in communication with the water tank, and other ends of the water supply pipes are provided with drip ports;

support seats, a number of the support seats is equal to a number of the cultivation boxes, and the support seats are all fixedly installed on the second annular bracket, and rotating sleeves are rotatably installed on the support seats, and a plurality of inclined slots are formed in each of the rotating sleeves;

arc-shaped adjusting blocking plates, wherein the arc-shaped adjusting blocking plates are sleeved on middles of the rotating sleeves and are located directly above the water inlets, and the arc-shaped adjusting blocking plates are also located directly below the drip ports, wherein a thickness of each of the arc-shaped adjusting blocking plates gradually decreases along a reverse direction of a rotation of each of the rotating sleeves; and an automatic driving module, wherein the automatic driving module is connected with the second annular bracket and the rotating sleeves respectively, and is connected with the *Morchella esculenta* cultivation cover;

wherein the automatic driving module comprises: supporting slide bars, wherein the supporting slide bars are fixedly installed on the second annular bracket;

an annular driving plate, wherein the annular driving plate is sleeved in the rotating sleeves and is slidably connected with the supporting slide bars;

driving columns, a number of the driving columns is plural, and a plurality of the driving columns are uniformly distributed on the annular driving plate, and the driving columns are also slidably connected with the inclined slots in each of the rotating sleeves;

a sliding column, wherein the sliding column is fixedly installed on the annular driving plate; and an inclined guide frame, wherein the inclined guide frame is fixedly connected with an inner wall of the *Morchella esculenta* cultivation cover, and the inclined guide frame is also slidably connected with the sliding column;

further comprising: a temperature control base, wherein the temperature control base is located between the fixing seat and the *Morchella esculenta* cultivation cover; and temperature control discharge holes, a number of the temperature control discharge holes is plural, a plurality of the temperature control discharge holes are uniformly opened on the rotating sleeves, and the temperature control discharge holes are also connected with the temperature control base through pipelines;

further comprising: a storage ring groove, wherein the storage ring groove is fixedly installed on the fixing seat, and a plurality of shading cloths are accommodated in the storage ring groove;

arc-shaped positioning plates, wherein the arc-shaped positioning plates are fixedly connected with ends of the shading cloths and are detachably connected with the storage ring groove, wherein a number of the arc-shaped positioning plates is equal to a number of the shading cloths, and an arc length of each of the arc-shaped positioning plates is smaller than a width of each of the shading cloths; and a shielding pulling assembly, wherein the shielding pulling assembly is connected with the arc-shaped positioning plates and the supporting top plate respectively;

wherein the shielding pulling assembly comprises: a control box, wherein the control box is located between the supporting top plate and the water tank;

winding devices, wherein the winding devices are located on the control box, and a number of the winding devices is equal to the number of the arc-shaped positioning plates, and the winding devices are paired with the arc-shaped positioning plates;

crown blocks, a number of the crown blocks is plural, and a plurality of the crown blocks are uniformly distributed on the supporting top plate;

pull ropes, ends of the pull ropes are fixedly connected with the arc-shaped positioning plates, and other ends of the pull ropes bypass the crown blocks and are connected with the winding devices; and adsorption slots, wherein the adsorption slots are formed on the supporting top plate and the adsorption slots are also detachably connected with the arc-shaped positioning plates;

further comprising: illumination detection plates, wherein a number of the illumination detection plates is equal to a number of the adsorption slots, and the illumination detection plates are uniformly distributed on the water tank and are arranged opposite to the adsorption slots.

\* \* \* \* \*